Feb. 8, 1944.    A. L. GREENLAW    2,341,439
GRILL
Filed May 6, 1942
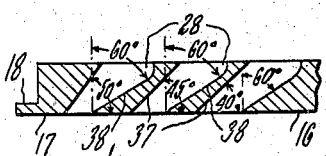
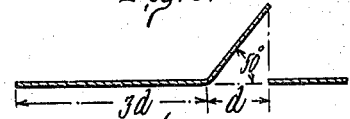
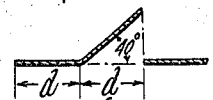
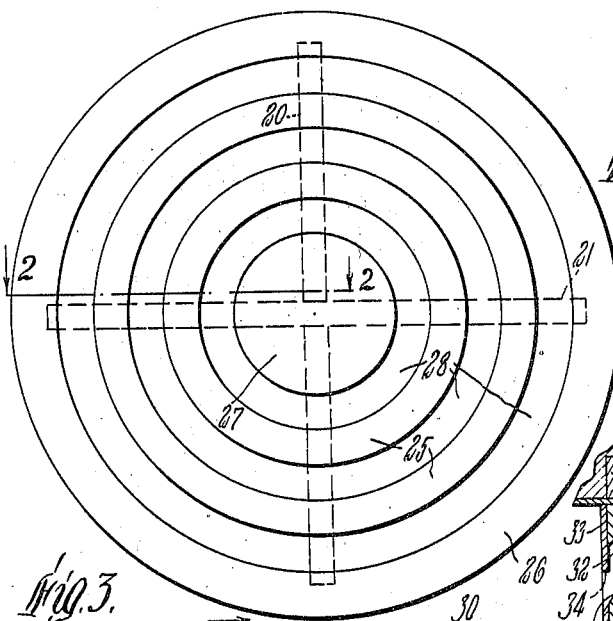
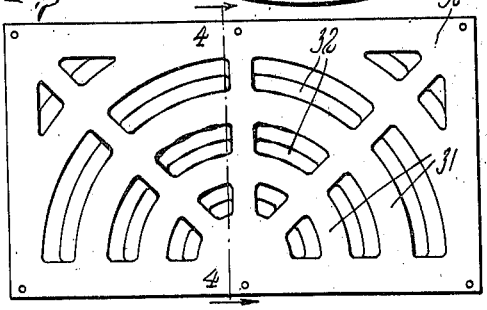
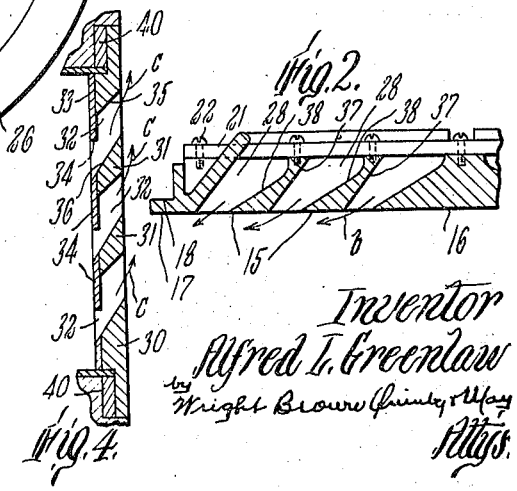
Inventor
Alfred L. Greenlaw Patented Feb. 8, 1944

2,341,439

UNITED STATES PATENT OFFICE 2,341,439

GRILL

Alfred L. Greenlaw, New Britain, Conn.

Application May 6, 1942, Serial No. 441,897

10 Claims. (Cl. 98—40)

This application is a continuation in part of my copending application Serial No. 279,443, filed June 16, 1939.

When introducing air into a room, whether for heating, cooling or ventilation, it is highly desirable that this be accomplished in a manner which will not impart a sensation of draft to persons in the room. Heretofore attempts to avoid sensation of draft have commonly been based on the idea of reducing the velocity of the air entering the room to a low value, and to this end the entering air column has been enlarged in cross section as by the use of ducts flaring outwardly toward the interior of the room, and usually with means for dividing the flow in the desired proportions between the ducts.

The present invention has for an object to produce the same freedom from drafts but by a different method of control which has certain advantages over the method previously described.

In accordance with the method of this invention, the entering air is so controlled that it spreads outwardly close to the surface of the wall in which the outlet opening is placed and it diffuses therefrom into the remainder of the room.

One advantage of this method is that it requires no long tapering air passages. Thus the grill may be used where there is no room for such long air passages. For example, it is possible to set the grill substantially flush with the wall, even when there is little space back of the wall to the end of the distribution duct through which the air is supplied to the room.

A further advantage is that it makes possible the use of a grill having exposed face portions of substantial width, which, in turn, permits the grill to be made with much greater mechanical strength. It is thus practicable to place such a grill in the floor where it may be walked on and may support substantial weight, without injury.

Where no substantial weight is required to be supported by the grill, it may be made of very light construction which can be made very cheaply and with a small amount of material.

For a more complete understanding of this invention, reference may be had to the accompanying drawing, in which Figure 1 is a front elevation of a grill embodying the present invention.

Figure 2 is a sectional view on line 2—2 of Figure 1.

Figure 3 is a front elevation of a grill showing a modified construction.

Figure 4 is a sectional view on line 4—4 of Figure 3, but showing the grill set into a wall.

Figure 5 is a diagrammatic section showing various angular relations of the side walls of the grill openings.

Figures 6 and 7 are diagrammatic views illustrating critical factors in the grill construction.

Figures 8 and 9 are diagrammatic views illustrating effective discharge angles from the grill openings.

In Figures 1 and 2 a construction is shown in which the grill is capable of taking considerable weight without damage. In the construction there shown the grill is formed of a series of radially spaced annular elements 15 concentric with each other and arranged about a central generally conical shaped portion 16 substantially closed against the escape of air and surrounded by a ring element 17 provided with a rim or flange 18 which may overlie the face of the wall in which the grill is placed. The several ring members and the member 16 may be secured together, as by the use of supporting strips 20 and 21, which may be arranged at right angles to each other and to which the various ring members may be secured as by the screws 22. It will be noted that each of the ring members 15 is comparatively narrow at its rear face and flares toward its forward face, presenting at its forward face an annular area 25 of substantial width. Likewise the ring member 17 presents such an area 26 and the conical member 16 also presents a circular area 27 of substantial size. These various areas are separated by the annular passages 28 through which the air escapes into the room. Each of these passages has a side wall portion 37 on its outer face arranged at an angle to the axis of the grill and an inner side wall 38 which makes a more acute angle than the wall 37 with the forward face 25. The terms inner and outer are used herein to indicate the direction toward and away from the center of the grill. The air passing along the walls 38 and escaping at the front of the grill produces a low pressure effect over the front face of the next outer ring member, causing the air to be discharged laterally across the outer faces of these members, rather than directly out into the room as indicated by the arrows b, provided that the angle between the outer faces of the annular ring member and the discharge face of the grill is not sufficient to cause the air to break away from the surface of the outer faces.

The air passages or apertures are arranged in arcuate series and spread the air over a continuous area outwardly from a center in a radial direction. As the ring members of Figures 1 and 2 are quite substantial in cross sectional areas, they may be formed of individual castings and they present a structure quite rigid and capable of receiving substantial loads without damage. As they are thin at the rear face they oppose little resistance to air flow. As the passages are of sufficient depth relative to their widths and to the angularities of their side walls, the rear edge of each wall 38 may overlap the forward edge of the wall 38 of the same passage, and thus effectively prevent the passage of air through the grill perpendicular to its front face.

In Figures 3 and 4 a modification is shown in which the grill openings are formed semi-circular instead of circular. The grill itself may be formed of a single forward casting or plate 30 having the arcuate solid portions 31 defining between them the air passages 32, and in order to provide for each of the solid portions cutting off a view entirely through the grill and preventing passage of air perpendicularly to the front face of the grill, the back face of the grill may have secured thereto a plate 33 having annular portions 34 partly closing off the rear ends of the passages 32. Here again, the outer walls as 35 of the several air passages are arranged more obtuse to the front face of the grill than are the inner walls 36, so that the air escaping beyond the walls 36 tends to create the vacuum on the exposed outer faces of the portions 31 which, provided the angle at which the air breaks away from the contour of the member is not exceeded, thereby deflects the air escaping from those openings into parallelism with the front face of the grill as shown by the arrow c.

The angles of the walls in all of the constructions shown best suited depend on various factors, such as width of the walls between the air openings, the smoothness of the side walls of the air passages and the velocity of the air entering.

Certain factors, however, have been found rather critical as follows:

(a) Ratio of length to width of slot which should be at least 5, and 6 is safer. This may also be stated as: the ratio of the lengths of the partitions at the grill slots to the distance by which these partitions are spaced should be at least 5 and is preferably greater than 6. In the case of annular slots which are thus continuous, the ratio in effect approaches infinity and offers no difficulties;

(b) In the case of the straight slot, the slot should be at least six inches in length;

(c) The angle at the outer side of the slot in sizes of grill larger than six inches diameter cannot be much larger than 50° in order that the jet issuing from the slot will not break away from the contour of the member and may be turned toward parallelism with the wall surface, and with this angle there must be a border or flat wall at substantially the plane of the face of the grill of at least substantially three times the width of the slot as shown in the diagram of Figure 6, where the width of the slot is indicated at d. If this angle is reduced, the width of the border may be reduced also, and with a 40° angle may be substantially the width of the slot. Even with a very wide border, however, the angle cannot be safely increased more than two or three degrees beyond 50°. In this range the jet may become unstable, changing suddenly between substantial parallelism to the face of the grill and outwardly directed at about the angle of the outer wall of the slot. This change in angle is apparently dependent on factors difficult to determine or control. With small size grills such as those of six inches in diameter, the workable angle below the critical is somewhat though not much greater than with the larger sizes. The angularity of the inner wall of the slot to the perpendicular to the face of the grill appears to be of no particular consequence so long as the air jet is directed against the outer wall, but in order to so direct the air jet, its sides must either converge toward the outlet or the inner wall member must have a lip or flat section near to its outer edge, or the angle of diversion from the axis of the outer wall must be acute enough to provide this pressure of the air against the outer wall. Where the outer wall does not extend to a point directly back of the inner edge of the slot, the air tends to break away from the contour of the member at a smaller angle, while if the plane of the face of one member is forwardly of the plane of the face of the next member, the air has less tendency to break away from the contour of the members as shown diagrammatically in Figures 8 and 9 by the angles $\theta$ and $\phi$, respectively.

In Figure 8 the line $x$ is perpendicular to the outer wall member and the line $y$ joins the back edge of the outer wall member with the forward edge of the inner wall member. In this design the angle which line $w$ makes with the face of the grill will determine when the air stream will break away from the contour of the member and not line $z$. $\theta$ indicates the amount that this angle is greater than the actual angle of the side wall of the passage.

Similarly, in Figure 9, the angle which determines when a break away will occur is smaller than the actual angle of the side wall of the passage by the angle $\phi$. Where the proportions are correct, the air issues from the grill not at the angle of the outer wall of the slot, but at a much smaller angle which gives the substantially parallel face flow of air desired. If the angle of the outer wall of the passage is too great for the width of the border, the air issues at substantially the angle of the outer wall of the slot. When concentric slots are employed, the characteristic of the outer slot has a greater controlling effect than the characteristics of the slots nearer to the center, though those nearer to the center cannot be ignored, as if they tend to be on the wrong side of the critical values, the stability of the whole unit may be adversely affected. It is found in practice that the angles may be made so acute as to cause the air to impinge on the wall in an annular form beyond the confines of the grill itself, this being evidenced where the air contains dust by the formation, after a time, of a darkened ring on the face of the wall. In order to avoid this, the angles may be so chosen with respect to the velocity of the air and the smoothness of the walls and the spacing of the outlet openings that the air does not flow directly against the wall but strikes it more gently some distance out from the edge of the grill. One method which has been found satisfactory is to vary the angles from the center of radiation to the outside edges so as to make them more obtuse at the outer edge of the grill. This causes the air at the outer edge of the grill to tend to pass out into the room, more before turning to flow in the direction of the wall. This tends to throw the particles of dirt out of the air and causes the air stream to hit the wall more gently, thus tending to prevent the formation of this darkened area. For example, as shown in Figure 5, the angle between the front face of the grill and the outer wall of the inner air passage to the center of the grill may be 40° and the inner wall of this air passage may make an angle of 60° to the perpendicular to the front face. The angles of the outer walls may be varied either gradually away from the center or at the outer opening only such that at the outermost opening the outer wall of the air passage makes an angle of 50° to the front face while the inner wall of the air passage is arranged at the same angle of 60° to the perpendicular to this face. As shown the angles of the outer walls of the partitions which are the inner walls of the air passages are all the same, while the angles of the inner walls of the partitions which are the outer walls of the air passages are varied. The effective discharge angles of the passages are determined by the angles of the outer walls of the passages when these passages converge toward the discharge as herein shown. With this arrangement the air coming into the room toward the center of the grill tends to spread out flatwise, hugging the grill face until it reaches the outer portion of the grill where it is deflected outward but still not sufficiently to entirely break away from the wall, but sufficiently to cause the air stream to hit the wall gently several inches out from the edge of the grill. For the same purpose, it is advantageous to set the grill in the wall with its outer face flush with the outer wall surface as shown in Figure 4, where the grill is secured to a ring 40 set into the wall a sufficient distance.

The critical angle for the discharge of air for any passage between wall members as determined by the design of the front face of the grill, the deflection rearward, the depth and curvature of the outer side wall and width of an air passage or space between the wall members may be defined as the angle at which the air stream discharged through the passage no longer clings to the contour of the member and turns in a substantially lateral direction, but breaks away from the contour of the member and flows from the front face of the grill into the room in a more nearly axial direction.

From the foregoing description of certain embodiments of the invention, it should be evident to those skilled in the art that various changes and modifications might be made without departing from the spirit or scope of this invention.

I claim:

1. A grill comprising a forward plate slotted in directions forwardly and outwardly flaring relative to the perpendicular to its outer face, the outer walls of said slots flaring less than their inner walls, and a back plate having slots mating the inner portions of said front plate slots and having portions extending inwardly of the outer edges of the next adjacent forward plate slots.

2. In combination, a wall having a grill provided with a substantially flat discharge face set substantially flush with the face of said wall, said grill comprising a structure including a plurality of partition members arranged in arcuate series about a central portion and defining between them a series of passages having outlets on the outer face of the grill, said partitions presenting faces of substantial widths between said passages at the forward face of said grill and having side walls converging rearwardly toward an axis perpendicular to said central portion and presenting relatively narrow rear edges, said central portion being substantially closed to the escape of air, and said partitions extending backwardly sufficiently to effectively prevent passage of air through said structure perpendicular to said outer face.

3. In combination, a wall having a grill provided with a substantially flat forward discharge face set substantially flush with the face of said wall, said grill comprising a structure including a plurality of partition members arranged in arcuate series about a central portion and defining between them a series of passages having outlets at the discharge face of the grill, said partition members being narrow at their rear faces and presenting wider faces between the said passages at the forward face of the grill, the forward faces of the partition members lying substantially flush with the forward discharge face of the grill, the central portion being substantially closed to the escape of air, the inner walls of said members having an angle with respect to discharge face of the grill not substantially greater than 50° capable of causing the air discharged through the passages to follow the contour of the inner walls and forward faces of said members and be discharged substantially laterally across the discharge face of the grill.

4. A grill comprising a structure including a plurality of partition members arranged in arcuate series about a central portion and defining between them a series of passages having outlets at the outer discharge face of said structure, said partition members presenting faces of substantial widths between said passages at the forward face of said structure and having side walls converging rearwardly toward an axis perpendicular to said central portion and presenting relatively narrow rear faces, said partitions extending backwardly with their rear faces at least in perpendicular alinement with the front faces of adjacent partition members, the effective angularity of said passages to said outer discharge face as defined by the angularity of the inner sides of said partition members being sufficiently small to cause the escape of air to produce low pressure conditions at the inner edges of said faces causing said air to be displaced outwardly from the center of said series of partition members at angles less than said effective angles, said central portion being substantially wholly closed to the escape of air.

5. A grill comprising a structure including a plurality of partition members arranged in arcuate series about a central portion and defining between them a series of passages having outlets at the forward discharge face of said structure, said partition members presenting faces of substantial widths between said passages at the forward face of said structure and having side walls converging rearwardly toward an axis perpendicular to said central portion and presenting relatively narrow rear faces, the outer walls of the said passages having an angle with respect to the discharge face of the grill not substantially greater than 50° capable of causing the air discharged through the passages to follow the contour of the inner walls and forward faces of said members and be discharged substantially laterally across the discharge face of the grill.

6. An air distributing device for an enclosure comprising a series of concentric annular members arranged about a central member substantially closed against the outward discharge of air, said annular members presenting relatively wide front faces and narrow rear faces, said annular members having inner and outer side walls forming passageways between them, the outer edge of the front face of each annular member terminating inwardly of the inner edge of the front face of the next larger annular member, the outer walls of said passages having an angle with respect to the front faces of the annular members not substantially greater than 50° capable of causing the air discharged through the passages to follow the contour of the outer walls of said passages and be discharged substantially laterally across the front faces of the annular members.

7. A grill having a substantially flat forward discharge face, said grill being provided with a series of inclined slots having between them wall members, said wall members having relatively narrow rear faces and wider front faces, said slots being at least six inches long, the wall on one side of each slot making a less angle with respect to the discharge face of the grill than the other wall on the opposite side of the slot, the last mentioned wall making an angle not greater than 50° capable of causing the air discharged through the slots to follow the contour of the wall members between said slots and be discharged substantially laterally across the discharge face of the grill.

8. A grill comprising a concentric series of partition members defining between them a series of annular air passages, the side walls of the passages converging toward the outer face of the grill, the outer walls of the outer of said passages sloping less than those nearer the center thereof, said partitions presenting faces wider at their forward faces than at their rear faces.

9. A grill having a forward discharge face, comprising a concentric series of partition members arranged about a central member substantially wholly closed against the outward passage of air, said partition members defining between them a series of concentric endless air passages, the side walls of the air passages converging toward the forward discharge face of the grill, the inner walls of the passages making a less angle with respect to the forward discharge face of the grill than the outer walls of said passages, the outer walls of said passages having an angle with respect to the forward discharge face of the grill not substantially greater than 50° capable of causing the air discharged through the passages to follow the contour of the inner walls and forward faces of said members and be discharged substantially laterally across the discharge face of the grill.

10. In combination, a wall having a grill mounted therein, said grill having a forward discharge face, said grill comprising a plurality of arcuate partition members having relatively wide front faces and relatively narrow rear faces arranged about a central section substantially closed to the escape of air, said arcuate partition members having walls forming passageways between them for the escape of air, the inner side walls of the partition members sloping rearwardly toward the center of the grill, said walls making an angle with respect to the face of the grill sufficiently small so that the air passing through the passageways will not break away from the inner walls and forward faces of the members but will follow the contour of the inner walls and forward faces of the said members and be discharged substantially laterally across the discharge face of the grill.

ALFRED L. GREENLAW.